United States Patent Office 2,884,420
Patented Apr. 28, 1959

2,884,420

6-FLUORO-17α,21-EPOXY-1,4-PREGNADIENES

George B. Spero, Barney J. Magerlein, William P. Schneider, and John A. Hogg, Kalamazoo, Mich., assignors to The Upjohn Company, Kalamazoo, Mich., a corporation of Michigan No Drawing. Application June 9, 1958
Serial No. 740,592

2 Claims. (Cl. 260—239.55)

This invention relates to novel steroids, 6,21-difluoro-11β,17α - dihydroxy - 1,4 - pregnadiene - 3,20 - diones and 6,21 - difluoro - 17α - hydroxy - 1,4 - pregnadiene - 3,11,20-triones, and to intermediates and processes for making the same. It relates particularly to 6α,21-difluoro-11β,17α - dihydroxy - 1,4 - pregnadiene - 3,20 - dione (1 - dehydro - 6α,21 - difluoro - 21 - desoxyhydrocortisone) and 6α,21 - difluoro - 17α - hydroxy - 1,4 - pregnadiene - 3,11,20 - trione (1 - dehydro - 6α,21 - difluoro - 21-desoxycortisone) intermediates in the production thereof, and processes for their production.

The novel 1 - dehydro - 6,21 - difluoro - 21 - desoxyhydrocortisones and 1 - dehydro - 6,21 - difluoro - 21 - desoxycortisones of the present invention possess a high order of glucocorticoid and anti-inflammatory activity. They are useful in the treatment of various arthritic conditions and in the control of inflammatory conditions due to bacterial infections or allergic reactions of skin or mucous membranes. The compounds possess diuretic activity in that they cause a loss of salt and water which makes them especially valuable in the management of chronic congestive heart failure and in the treatment of cirrhosis of the liver, the nephrotic syndrome, and the treatment of eclampsia and pre-eclampsia. For example, 1 - dehydro - 6α,21 - difluorohydrocortisone has glucocorticoid activity about twelve times that of Kendall's Compound F and anti-inflammatory activity about ten times that of Kendall's Compound F.

The new compounds and the process of the present invention are illustratively represented by the following flow sheet and formulae:

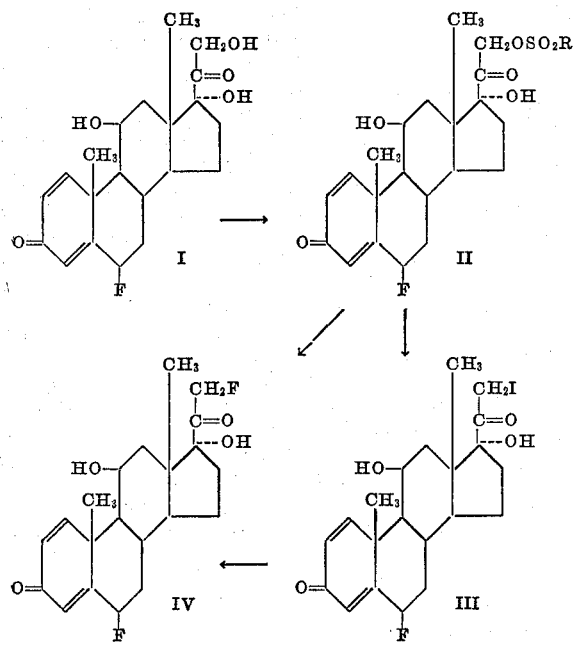

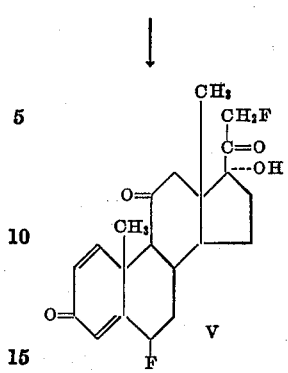

wherein R is an organic radical, particularly a hydrocarbon radical containing up to and including ten carbon atoms, such as ethyl, phenyl, tolyl, naphthyl, or the like, with methyl preferred.

The process of the present invention comprises treating 6 - fluoro - 11β,17α,21 - trihydroxy - 1,4 - pregnadiene - 3,20 - dione (1 - dehydro - 6 - fluorohydrocortisone) (I) with an organic sulfonyl halide to obtain the corresponding 21-ester, (II), a 21-alkyl or 21-arylsulfonate of 6 - fluoro - 11β,17α,21 - trihydroxy - 1,4 - pregnadiene-3,20-dione. Treating the thus produced 21-alkyl or arylsulfonate of 6-fluoro-11β,17α,21-trihydroxy-1,4-pregnadiene-3,20-dione (II) with an iodinating agent yields 6 - fluoro - 11β,17α - dihydroxy - 21 - iodo - 1,4 - pregnadiene-3,20-dione (III). Fluorination of 6-fluoro-11β,17α - dihydroxy - 21 - iodo - 1,4 - pregnadiene - 3,20 - dione (III) produces 6,21-difluoro-11β,17α-dihydroxy-1,4-pregnadiene-3,20-dione (IV). Compound (IV) can also be obtained by fluorinating directly 6-fluoro-11β,17α,21-trihydroxy - 1,4 - pregnadiene - 3,20 - dione - 21 - methanesulfonate (II). Oxidation of 6,21-difluoro-11β,17α-dihydroxy-1,4-pregnadiene-3,20-dione produces 6,21-difluoro - 17α - hydroxy - 1,4 - pregnadiene - 3,11,20 - trione (V). Similarly, when the 11-keto analogue (1-dehydro-6-fluorocortisone) is utilized as starting material in the above series of reactions, 6,21-difluoro-17β-hydroxy-1,4-pregnadiene-3,11,20-trione (V) is produced directly without the step of oxidation of the 11β-hydroxyl.

Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions, and the like, with or without coacting antibiotics, germicides or other materials forming advantageous combinations therewith.

As will hereinafter be described in greater detail, these compounds are additionally useful as intermediates in the production of 1-dehydro-6,21-difluoro-9α-halo-21-desoxyhydrocortisone and 1-dehydro-6,21-difluoro-9α-halo-21-desoxycortisone. The 9α-halo derivatives are of particular importance because they possess a combination of high anti-inflammatory and glucocorticoid properties with low concomitant mineralocorticoid activities.

The starting steroids for the compounds and process of the present invention are 1-dehydro-6α-fluorohydrocortisone or 1-dehydro-6β-fluorohydrocortisone or the corresponding 11-keto compounds and are prepared in accordance with the procedures of preparations 1 through 12 herein.

In carrying out the process of this invention, 1-dehydro-6-fluorohydrocortisone or 1-dehydro-6-fluorocortisone is treated with an organic acid sulfonyl halide such as methanesulfonyl chloride, toluenesulfonyl, chloride, toluenesulfonyl bromide, benzenesulfonyl chloride, naphthylsulfonyl chloride, or the like; the methanesulfonic acid halides, especially methanesulfonyl chloride, being preferred. In the preferred embodiment, the starting steroid is reacted with the alkyl or aryl sulfonyl halide in a solvent such as pyridine, benzene, toluene, or the like. Sufficient amine base, e.g., pyridine, should be added to react with any halogen acid formed. The sulfonyl halide reaction is conducted at a temperature between minus ten and plus sixty degrees centigrade, providing at the lower temperature the solvent has not solidified. Thus, for pyridine, dioxane, toluene, or the like, temperatures in the range of zero to ten degrees centigrade can be used, while for benzene only temperatures above five degrees centigrade are suitable because of the relatively high melting point of the latter compound. The reaction time is usually between about thirty minutes and eight hours, after which the product, 6-fluoro-11β,17α,21-trihydroxy-1,4-pregnadiene - 3,20 - dione 21 - alkyl or aryl sulfonate, is recovered in a conventional manner, such as by evaporating the solvent to produce a dry residue, followed, if desired, by mixing the residue with water and extracting the purified material therefrom. For extraction, solvents such as methylene chloride, chloroform, carbon tetrachloride, benzene, ether, toluene, or the like, can be used. Removal of the extraction solvent by distillation leaves the 21-alkyl or aryl sulfonate.

The 6 - fluoro-11β,17α,21-trihydroxy-1,4-pregnadiene - 3,20-dione 21-alkyl or aryl sulfonate is then reacted with a fluorinating agent such as potassium fluoride, silver fluoride or antimony fluoride in an inert solvent such as dimethylsulfoxide, acetonitrile, dimethylformamide or ethylene glycol solution, potassium fluoride in dimethylsulfoxide being preferred. The reaction is advantageously conducted under continuous heating, and it proceeds generally for a period of about six to 24 hours, fifteen to twenty hours being usually sufficient. The reaction mixture is then diluted with an organic solvent such as methylene chloride, chloroform, benzene, and the like, and purified in a conventional manner, as, for example, by chromatography or solvent extraction.

An advantage of this fluorinating method is that it is productive of minor amounts of 6-fluoro-11β-hydroxy-17α,21-epoxy-1,4-pregnadiene-3,20-dione (Compound VI) of the following structural formula:

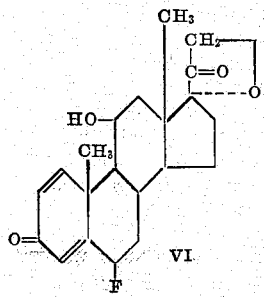

Compound VI (the 6α- or 6β-epimer) possesses glucocorticidal and anti-inflammatory properties similar to those of Compounds IV and V, though to a modified degree, and possesses particularly marked diuretic activity.

Alternatively, the 6-fluoro-11β,17α,21-trihydroxy-1,4-pregnadiene-3,20-dione 21-alkyl or aryl sulfonate can first be converted to the corresponding 21-iodo compound (III), which is readily convertible to the 21-fluoro steroid. The 21-iodo steroid is prepared by reacting the said 21-alkyl or aryl sulfonate with sodium, potassium or lithium iodide in an oxygenated hydrocarbon solution, e.g., an alkanone solution, such as acetone. A molar excess of sodium iodide (three to twenty moles of sodium iodide per mole of steroid) is generally preferred for this reaction. The reaction mixture containing the 21-alkyl or aryl sulfonate and sodium iodide and acetone is heated to reflux for a period of about three minutes to thirty minutes. The thus produced 6-fluoro-11β,17-dihydroxy-21-iodo-1,4-pregnadiene-3,20-dione can then be isolated by evaporating the solvent. For the subsequent reaction, the 21-iodo steroid can be used either in purified form as a product of recrystallization from such organic solvents as acetone, ethanol, Skellysolve B (brand of hexane hydrocarbons), or the like, or it can be used in the crude state in the next step of the synthesis.

The 21-iodo steroid, dissolved in a solvent such as acetonitrile, dimethylformamide or ethylene glycol, is treated with silver fluoride, antimony fluoride, potassium fluoride, or the like, acetonitrile and silver fluoride, respectively, being preferred. The metal fluoride should be added in small quantities at intervals, and the reaction mixture should be protected from light during the reaction period, which usually ranges from one-half to six hours. The reaction mixture is then concentrated and the product extracted as in the previous steps to yield essentially pure 6,21-difluoro-11β,17α-dihydroxy - 1,4 - pregnadiene-3,20-dione.

The oxidation of 6,21-difluoro-11β,17α-dihydroxy-1,4-pregnadiene-3,20-dione is generally carried out in a conventional manner, such as, for example, by oxidizing the said 6,21-difluoro steroid in acetic acid solution with chromic acid using molar quantities or a slight excess thereof, such as from ten to thirty percent excess, or by oxidizing with a halo amide or imide of an acid, such as N-bromoacetamide, N-chlorosuccinimide, or N-bromosuccinimide dissolved in pyridine, dioxane, or other suitable solvents. After termination of the oxidation reaction, the oxidant is generally destroyed by addition of an arresting agent such as methyl alcohol or ethyl alcohol for the chromic acid oxidant or a bisulfite for chromic acid, N-bromoacetamide, N-bromosuccinimide and other N-halo acyl amides and imides. Thereafter, the resulting 6,21-difluoro-17α-hydroxy-1,4-pregnadiene-3,11,20-trione is recovered by conventional means, such as by extraction with water-immiscible solvents, e.g., methylene chloride, ethylene chloride, chloroform, carbon tetrachloride, ether, benzene toluene or the like, or by chromatography.

As hereinbefore indicated, the compounds of the present invention are additionally useful as intermediates in the production of the valuable 9α-fluoro derivatives. Thus 6,21-difluoro - 11β,17α - dihydroxy-1,4 - pregnadiene-3,20-dione can be dehydrated with N-bromoacetamide and anhydrous sulfur dioxide in pyridine by permitting the reaction to continue until a negative acidified potassium iodide-starch test of the reaction mixture is obtained. Dilution with cold water results in the precipitation of 6,21-difluoro-17α - hydroxy-1,4,9(11) - pregnatriene-3,20-dione, which can be purified by recrystallization from acetone. The crystalline product can then be reacted in methylene chloride-tertiary butyl alcohol solution with perchloric acid and N-bromoacetamide or N-iodosuccinimide to produce a reaction mixture from which 6,21-difluoro-9α-bromo-11β,17α - dihydroxy-1,4 - pregnadiene-3,20-dione or the corresponding 6,21-difluoro-9α-iodo compound can be recovered by precipitation with ice water and recrystallization from acetone. The latter compound can be reacted in acetone solution with anhydrous potassium acetate at reflux temperatures to produce 6,21-difluoro-9(11)-oxido-17α - hydroxy-1,4-pregnadiene-3,20-dione, which is recoverable from the reaction mixture by chromatography and can be further purified by recrystallization from Skellysolve B hexanes-acetone. Reaction of the said 9(11)-oxido compound in methylene chloride solution with aqueous hydrogen fluoride at room temperature is productive of 6,9α,21-trifluoro-11β,17α-dihydroxy-1,4-pregnadiene-3,20-dione. Substitution of aqueous hydrogen chloride at lower reaction temperatures yields 6,21-difluoro-9α - chloro - 11β,17α - dihydroxy - 1,4-pregnadiene-3,20-dione. If desired, either the 9α-fluoro or chloro product can be oxidized with N-bromoacetamide in pyridine solution to give 6,9α,21-trifluoro-17α-hydroxy-1,4-pregnadiene-3,11,20-trione or the corresponding 9α-chloro compound.

The steps of the foregoing process for the preparation of the 9α-halo steroids may be inverted without departing from the basic concepts of the process. Thus, 6-fluoro-11β,17α-dihydroxy-21-acyloxy-1,4-pregnadiene-3,20-dione can be selected as the starting steroid, the said 21-acyloxy compounds being prepared in the manner customarily employed for acylating hydrocortisone, e.g., by reaction of the appropriate 21-hydroxy steroid with the anhydride or acid halide of an organic carboxylic acid containing from one to twelve carbon atoms, inclusive, under conventional esterifying conditions. The said 21-acyloxy steroid can be dehydrated as by reaction with N-bromoacetamide and anhydrous sulfur dioxide in pyridine and the 9α,11β-bromohydrin formed by treatment with N-bromoacetamide in an acidic aqueous organic solution. The 9(11)-oxide group can then be introduced by reaction of the bromohydrin with potassium acetate in acetone. Fluorination of the resulting compound produces 6,9α-difluoro-11β,17α,21-trihydroxy-1,4-pregnadiene-3,20-dione, which can be fluorinated at the 21-position by the steps and methods earlier described.

In the foregoing processes, it should be understood that either 6α-halo epimer or the 6β-halo epimer can be utilized at any stage. The 6α-epimer can be obtained at appropriate intermediate stages by treatment of the 6β-compound, at temperatures of zero degrees centigrade or slightly lower and in an organic solvent such as chloroform, with an anhydrous mineral acid, such as hydrochloric acid, in the presence of alcohol. Such temperatures should be maintained throughout the period of addition of the acid. The reaction mixture can then be washed with successive portions of dilute alkali and water and evaporated under reduced pressure.

The foregoing reactions are exemplified in greater detail below. It will be understood by those skilled in the art, nevertheless, that the specific order of steps may be inverted or transposed or otherwise varied to suit the purposes of economics, convenience, or the like.

The following preparations and examples are illustrative of the process and products of the present invention but are not to be construed as limiting.

PREPARATION 1

*3-ethylene glycol ketal of methyl 3,11-diketo-5α,6α-oxido-17(20)-[cis]-pregnen-21-oate*

To a solution of 5.0 grams of the 3-ethylene glycol ketal of methyl 3,11-diketo-4,17(20)-[cis]-pregnadien-21-oate, prepared in the manner described in U.S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene glycol ketal of methyl 3,11-diketo-5α,6α-oxido-17(20)-[cis]-pregnen-21-oate melting at 206 to 209 degrees centigrade having an $[\alpha]_D$ of 37 degrees ($CHCl_3$) and having the analysis given below:

*Analysis.*—Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Chromatography gave two fractions: A, 481 milligrams eluted with methylene chloride plus five percent acetone and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction B on crystallization from acetone-Skellysolve B hexanes gave 470 milligrams of methyl 3,11-diketo-5α,6β - dihydroxy - 17(20) - allopregnen-21-oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

PREPARATION 3

*Methyl 3,11 - diketo - 5α - hydroxy-6β-fluoro-17(20)-allopregnen-21-oate 3-ethylene ketal*

A mixture of 1.9 grams of methyl 3,11-diketo-5α-hydroxy-6β-fluoro-17(20-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11 - diketo - 5α - hydroxy - 6β - fluoro - 17(20) - allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol is productive of the respective 3-alkylene ketals of methyl 3,11 - diketo - 5α - hydroxy - 6β - fluoro-17(20)-allopregnen-21-oate.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy - 6β - fluoro - 17(20) - allopregnen - 21 - oate 3-ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21 - trihydroxy - 6β - fluoro - 17(20) - allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy-6β-fluoro-21-acetoxy-17(20)-allopregnen-3-one 3-ethylene ketal*

The acetate was prepared by allowing 0.87 gram of 5α,11β,21 - trihydroxy - 6β - fluoro - 17(20) - allopregnen-3-one 3-ethylene ketal to stand overnight in ten milliliters of acetic anhydride and ten milliliters of pyridine.

The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21-trihydroxy-6β-fluoro-17(20)-allopregnen-3-one 3-ethylene ketals are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 5α,11β,21-trihydroxy-6β-fluoro-17(20)-pregnen-3-one 3-ethylene ketal with an appropriate acylating agent, e.g., the anhydride or acid halide of the selected acid in a solvent such as, for example, benzene, toluene, acetic acid, or the like. A convenient method of preparing the 21-formyloxy ester consists in contacting 5α,11β,21-trihydroxy-6β-fluoro-17(20)-pregnen-3-one 3-ethylene ketal with formic acid in the presence of para-toluenesulfonic acid.

PREPARATION 6

*5α,11β,17α-trihydroxy-6β-fluoro-21-acetoxy-allopregnane-3,20-dione 3-ethylene ketal*

To a solution of 0.77 gram of 5α,11β-dihydroxy-6β-fluoro-21-acetoxy-17(20)-allopregnen-3-one 3-ethylene ketal in 35 milliliters of tertiary butyl alcohol was added one milliliter of pyridine, 1.9 milliliters of N-methylmorphine oxide peroxide solution, and 13.1 milligrams of osmium tetroxide (9.1 milliliters of tertiary butyl alcohol solution containing 1.44 milligrams OsO₄ per milliliter). The solution was stirred for a period of 2.5 hours, fifteen milliliters of five percent sodium hydrosulfite added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,11β,17α - trihydroxy - 6β - fluoro-21-acetoxyallopregnane-3,20-dione 3-ethylene ketal, melting point 220 to 228 degrees centigrade.

PREPARATION 7

*5α,11β,17α - trihydroxy - 6β - fluoro - 21 - acetoxyallopregnane-3,20-dione*

A solution of 0.47 gram of 5α,11β,17α-trihydroxy-6β- fluoro - 21 - acetoxyallopregnane - 3,20 - dione 3-ethylene ketal in 35 milliliters of acetone and four milliliters of 1 N sulfuric acid solution was gently boiled on the steam bath for ten minutes, cooled and neutralized with dilute sodium bicarbonate solution. Addition of water and cooling gave 0.33 gram of 5α,11β,17α-trihydroxy - 6β - fluoro - 21 - acetoxyallopregnane - 3,20-dione, melting point 230 to 240 degrees centigrade.

PREPARATION 8

*6β - fluoro - 11β,17α - dihydroxy - 21 - acetoxy - 4 - pregnene - 3,20 - dione (6β - fluorohydrocortisone acetate)*

A solution of 100 milligrams of 5α,11β,17α-trihydroxy-6β - fluoro - 21 - acetoxyallopregnane - 3,20 - dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gave 38 milligrams of 6β-fluoro-11β,17α - dihydroxy - 21 - acetoxy - 4 - pregnene - 3,20-dione (6β-fluorohydrocortisone acetate), melting point 210 to 218 degrees centigrade. Infrared data and ultraviolet data are in agreement with the structure.

PREPARATION 9

*6α - fluoro - 11β,17α - dihydroxy - 21 - acetoxy - 4 - pregnene 3,20-dione (6α-fluorohydrocortisone acetate)*

A solution of 0.132 gram of 6β-fluoro-11β,17α-dihydroxy - 21 - acetoxy - 4 - pregnene - 3,20 - dione in twelve milliliters of chloroform and 0.1 milliliter of absolute alcohol was cooled to minus ten degrees centigrade in an ice-salt bath. A stream of anhydrous hydrochloric acid was bubbled through the solution for two and one-half hours, at a temperature of between minus five and minus fifteen degrees centigrade. The solution was diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B solution gave 42 milligrams of the isomerized product, 6α-fluoro - 11β,17α - dihydroxy - 21 - acetoxy - 4 - pregnene-3,20-dione, which melted at 203 to 210 degrees centigrade.

PREPARATION 10

*6α - fluoro - 11β,17α,21 - trihydroxy - 4 - pregnene - 3,20-dione (6α-fluorohydrocortisone) and the 6β-epimer thereof*

A solution was made of 1.1 grams of 6α-fluoro-11β, 17α - dihydroxy - 21 - acetoxy - 4 - pregnene - 3,20 - dione, one gram of potassium bicarbonate, 100 milliliters of methanol and fifteen milliliters of water and purged with nitrogen to remove dissolved oxygen while stirring at 25 degrees centigrade for four hours. The solution was neutralized with acetic acid and distilled to remove the methanol. The residue was extracted with 100 milliliters of methylene dichloride and the extract dried over sodium sulfate and passed over a column containing eighty grams of Florisil. The fraction eluted with Skellysolve B plus twenty and thirty percent acetone weighed 770 milligrams, a yield of 77.5 percent. Recrystallization from ethyl acetate-Skellysolve B gave crystals melting at 192 to 195 degrees centigrade. Substituting 6β-fluorohydrocortisone acetate, from Preparation 8, in the foregoing procedure is productive of 6β-fluorohydrocortisone.

PREPARATION 11

*6β - fluoro - 17α,21 - dihydroxy - 4 - pregnene - 3,11,20-trione (6β-fluorocortisone)*

Substitution of the corresponding 6α-epimer for the starting material above is productive of 6α-fluoro-17α, 21 - dihydroxy - 4 - pregnene - 3,11,20 - trione. Alternatively, the 6α-epimer can be obtained from the corresponding 6β product by the procedure of Preparation 9.

PREPARATION 12

*6α - fluoro - 11β,17α,21 - trihydroxy - 1,4 - pregnadiene-3,20-dione (Δ¹-6α-fluorohydrocortisone or 6α-fluoro-1-dehydrohydrocortisone) (I)*

Five 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis*, A.T.C.C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which in addition contained ten milliliters of an antifoam compound (a mixture of lard oil and octadecanol). The fermenter was placed in the water-bath, adjusted to 28 degrees centigrade and the contents stirred (300 r.p.m.) and aerated (0.3 liter air to five liters of beer). After 24 hours of incubation, when a good growth had been developed, five grams of 6α-fluorohydrocortisone acetate plus one-half gram of 3-ketobisnor-4-cholen-22-al dissolved in 25 milliliters of dimethylformamide was added and the incubation carried out at the same temperature (28 degrees centigrade) and aerated for a period of 72 hours (final pH 8.3). The mycelium was filtered off and washed with water. The wash water was combined with the filtrate and the whole was extracted with three two-liter portions of a mixture of methylene-ethyl acetate (3:1). Removal of the solvent by evaporation gave 5.25 grams of crude solid which was triturated twice with four milliliters of methylene chloride to give 2.4 grams of 1-dehydro-6α-fluorohydrocortisone of melting point 198 to 203 degrees centigrade. The analytical sample, recrystallized from acetone, melted at 202 to 204 degrees centigrade. Analysis gave $[\alpha]_D$ plus 73 degrees (dioxane) and the following:

Analysis.—Calculated for $C_{21}H_{27}O_5F$: C, 66.65; H, 7.10; F, 5.02. Found: C, 66.68; H, 7.19; F, 5.49.

Substitution of the 6β-epimer for the starting material above is productive of 1-dehydro-6β-fluorohydrocortisone. The 6β-epimer can be converted to the 6α-epimer following the procedure of Preparation 9.

EXAMPLE 1

*6α-fluoro-11β,17α,21-trihydroxy-1,4-pregnadiene-3,20-dione 21-methanesulfonate (II)*

Three hundred milligrams of 6α-fluoro-11β,17α,21-trihydroxy-1,4-pregnadiene-3,20-dione was dissolved in pyridine and cooled to a temperature of between zero and five degrees centigrade. 0.1 milliliter of methanesulfonyl chloride was added and the solution maintained between zero and three degrees centigrade for two hours. This was poured into a solution of three milliliters of concentrated hydrochloric acid diluted with fifty milliliters of water. 310 milligrams of crystalline 6α-fluoro-11β,17α,21-trihydroxy-1,4-pregnadiene-3,20-dione 21-methanesulfonate was precipitated from the diluted hydrochloric acid. The product melted with decomposition at 200 to 202 degrees centigrade. Infrared adsorption in a mineral oil mull were as follows: 3570, 3370 centimeters$^{-1}$(OH); 1727 centimeters$^{-1}$ (20-ketone); 1665 centimeters$^{-1}$, (conjugated ketone); 1623, 1601 centimeters$^{-1}$($\Delta^{1,4}$); 1360, 1342, 1172 centimeters$^{-1}$(O—$SO_2$).

EXAMPLE 2

*6α,21-difluoro-11β,17α-dihydroxy-1,4-pregnadiene-3,20-dione (IV)*

A mixture of 100 milligrams of 6α-fluoro-11β,17α,21-trihydroxy-1,4-pregnadiene-3,20-dione 21-methanesulfonate and fifty milligrams of potassium fluoride in one milliliter of dimethylsulfoxide was refluxed on a steam bath for eighteen hours. The mixture was diluted with fifty milliliters of methylene dichloride and washed two times with ten milliliters of water. The methylene chloride solution was passed over a column of twenty grams of Florisil (a synthetic magnesium silicate). Elution with a mixture composed of 91 parts of Skellysolve B (hexane hydrocarbons) and 9 parts of acetone gave a fraction of fourteen milligrams. The infrared absorption of this compound indicated it was 6α-fluoro-11β-hydroxy-17α,21-oxido-1,4-pregnadiene-3,20-dione (VI). The absorptions in mineral oil mull were as follows: 3380 centimeters$^{-1}$(OH); 1807 centimeters$^{-1}$ (four membered ring).

The fraction containing the principal product was eluted with a mixture composed of Skellysolve B and twelve to fifteen percent of acetone. The product weighed 28 milligrams and after recrystallization from a mixture of ethyl acetate and Skellysolve B yielded sixteen milligrams. The melting point of the purified 6α,21-difluoro-11β, 17α-dihydroxy-1,4-pregnadiene-3,20-dione was 226 to 231 degrees centigrade. Infrared absorptions in mineral oil mull follow: 3360 centimeters$^{-1}$ (OH); 1725 centimeters$^{-1}$ (ketone); 1655 centimeters$^{-1}$ (conjugated ketone); 1597 centimeters$^{-1}$ ($\Delta^{1,4}$).

EXAMPLE 3

*17α-hydroxy-6α,21-difluoro-1,4-pregnadiene-3,11,20-trione (V)*

A mixture was prepared containing 0.3 gram of 11β, 17α-dihydroxy-6α,21-difluoro-1,4-pregnadiene-3,20-dione, 100 milligrams of chromic anhydride, ten milliliters of glacial acetic acid and 0.5 milliliter of water. This mixture was stirred and maintained at room temperature for eight hours. The mixture was poured into fifty milliliters of ice water and neutralized by the addition of dilute sodium hydroxide. A precipitate formed and was collected on a filter. The precipitate was recrystallized three times from a mixture of ethyl acetate and Skellysolve B. The purified product was 17α-hydroxy-6α,21-difluoro-1,4-pregnadiene-3,11,20-trione.

EXAMPLE 4

*17α-hydroxy-6α,21-difluoro-1,4-pregnadiene-3,11,20-trione (V)*

In the same manner as shown in Example 1, treating 1-dehydro-6α-fluorocortisone with methanesulfonyl chloride in pyridine solution yielded 6α-fluoro-17α,21-dihydroxy-1,4-pregnadiene-3,11,20-trione 21-methanesulfonate. The 6α-fluoro-17α,21-dihydroxy-1,4-pregnadiene-3,11,20-trione 21-methanesulfonate thus obtained was refluxed with potassium fluoride in dimethylsulfoxide in the manner of Example 2 and yielded 17α-hydroxy-6α,21-difluoro-1,4-pregnadiene-3,11,20-trione.

Instead of the 1-dehydro-6α-fluorohydrocortisone or -cortisone, the 6β-epimers can be used in the above examples and, if the conditions are kept near neutral, the 6β-epimers, such as 6β,21-difluoro-11β,17α-dihydroxy-1, 4-pregnadiene-3,20-dione and 6β,21-difluoro-17α-hydroxy-1,4-pregnadiene-3,11,20-trione, can be isolated from the reaction mixture. The thus obtained β-epimers yield the 6α-epimers by treatment with acid or base in an organic solvent, e.g., ethanol at room temperature.

EXAMPLE 5

*6α,9α,21-trifluoro-11β,17α-dihydroxy-1,4-pregnadiene-3,20-dione*

A mixture of one gram of 11β,17α-dihydroxy-6α,21-difluoro-1,4-pregnadiene-3,20-dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture, and the mixture was maintained at about five degrees centigrade for thirty minutes. The precipitated white solid was filtered, washed with water and dried under vacuum. After crystallization from acetone there was obtained about 0.7 gram of 17α-hydroxy-6α,21-difluoro-1,4,9(11)-pregnatriene-3,20-dione.

0.5 gram of 17α-hydroxy-6α,21-difluoro-1,4,9(11)-pregnatriene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 9α-bromo-11β,17α-dihydroxy-6α,21-difluoro-1,4-pregnadiene-3,20-dione.

A mixture of 0.45 gram of 9α-bromo-11β,17α-dihydroxy-6α,21-difluoro-1,4-pregnadiene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 9(11)-oxido-17α-hydroxy-6α,21-difluoro-1,4-pregnadiene-3,20-dione.

A solution of one gram of 9(11)-oxido-17α-hydroxy-6α,21-difluoro-1,4-pregnadiene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate, and then poured over a column of 100 grams of Florisil synthetic magnesium silicate. The column was developed with Skellysolve B hexanes and acetone, and the fractions containing ten percent acetone were recrystallized from acetone and Skellysolve B hexanes to give pure 6α,9α,21-trifluoro-11β,17α-dihydroxy-1,4-pregnadiene-3,20-dione.

EXAMPLE 6

*6α,9α,21-trifluoro-17α-hydroxy-1,4-pregnadiene-3,11,20-trione*

Oxidizing, in the same manner given in Example 3, 6α,9α,21-trifluoro-11β,17α-dihydroxy-1,4-pregnadiene-3,20-dione with chromic anhydride in acetic acid solution produces 6α,9α,21-trifluoro-17α-hydroxy-1,4-pregnadiene-3,11,20-trione.

This application is a continuation-in-part of copending application Serial No. 699,529, filed November 29, 1957, now Patent No. 2,838,543 issued June 10, 1958.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-fluoro-17α,21-epoxy-1,4-pregnadiene of the following structural formula:

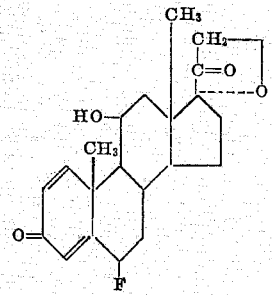

2. 6α - fluoro - 11β - hydroxy - 17α,21 - epoxy - 1,4-pregnadiene-3,20-dione.

No references cited.